Feb. 25, 1941.     S. A. LEVIN     2,232,792
METHOD OF AND APPARATUS FOR MEASURING IMPEDANCES
Filed Dec. 15, 1939
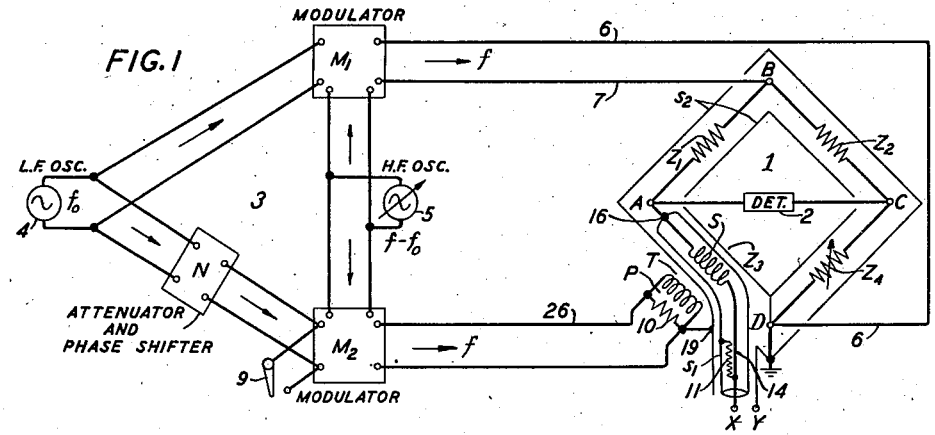
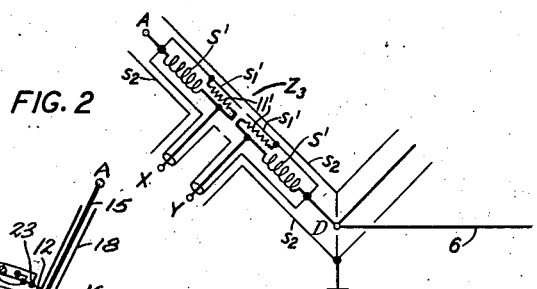
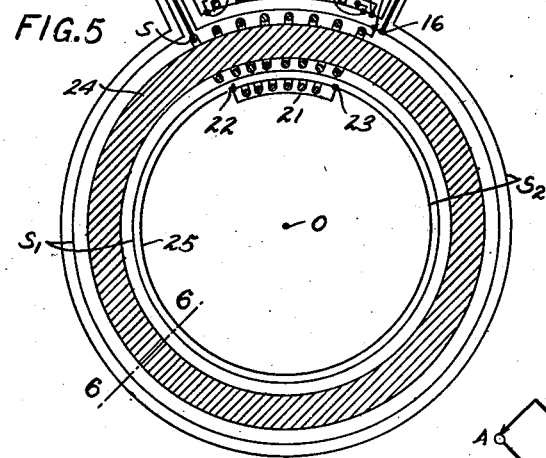
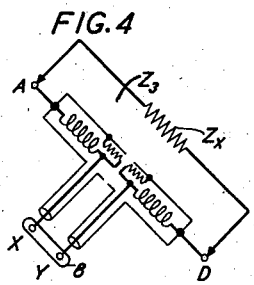
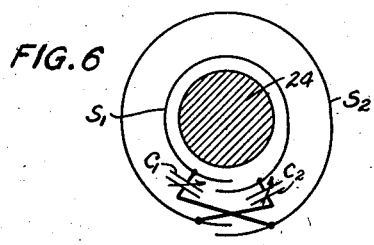
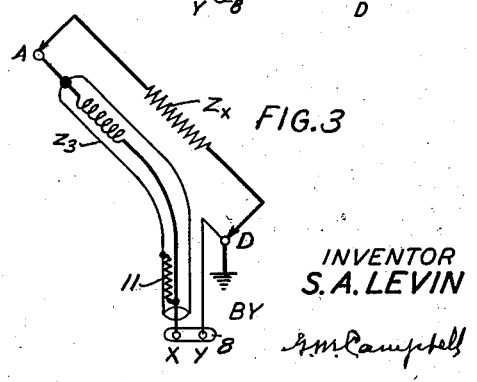
INVENTOR
S. A. LEVIN
BY
ATTORNEY Patented Feb. 25, 1941

2,232,792

UNITED STATES PATENT OFFICE 2,232,792

METHOD OF AND APPARATUS FOR MEASURING IMPEDANCES

Samuel A. Levin, New York, N. Y., assignor to Bell Telephone Laboratories, Incorporated, New York, N. Y., a corporation of New York Application December 15, 1939, Serial No. 309,344

18 Claims. (Cl. 175—183)

This invention relates to alternating current bridges for measuring impedances and more particularly to such bridges adapted to measure impedances at relatively high frequencies.

With the present-day trend toward the use of high frequencies in transmission, it has been found very helpful to be able to measure various impedance elements at the higher working frequencies rather than at the lower frequencies heretofore possible with ordinary alternating current bridge balance methods.

It is accordingly the object of this invention to provide a method of and apparatus for the measurement of impedance elements at relatively high frequencies with an accuracy and an ease of manipulation and computation comparable with the direct current or low frequency alternating current bridge measurements.

The invention attains the foregoing objects by providing a method of and means for measuring an unknown impedance by connecting it to one branch of a balanced and previously standardized alternating current electrical network whereby the network becomes unbalanced, and rebalancing the network by injecting into the same branch a voltage of controlled phase and magnitude.

Impedances may be measured by this invention whether they be balanced or unbalanced with respect to ground and two general types of connections, series and parallel, may be used to connect either kind of unknown impedance to the electrical network.

Standardization may be effected by using one or more fixed standard impedances in place of the unknown impedance in a manner hereinafter more particularly described.

Several outstanding advantages of this invention will become apparent upon a continued reading of the specification and these may be briefly summarized as follows:

First, the use of fixed standards instead of variable standards permits the use of standards of great accuracy and purity.

Second, the employment of fixed standards in the manner to be described retains all the important advantages of substitution methods.

Third, the means used to control the magnitude and phase of the injected voltages at the particular high frequency of measurement need not operate at this frequency, but may be made to work at a fixed low frequency so that calibration thereof can be easily effected and maintained at a high degree of accuracy.

Fourth, the method is rapid and yields results with an ease of manipulation comparable to measurements made with direct current bridges or low frequency alternating current bridges.

The invention may be better understood by referring to the accompanying drawing and the following specification wherein the invention is more particularly described.

Fig. 1 discloses one specific embodiment of the invention adapted for measuring impedances unbalanced to ground wherein the unknown impedance is connected in series with one arm of an alternating current bridge.

Fig. 2 discloses a modification of the A—D arm of the bridge disclosed in Fig. 1 adapted for measuring impedances balanced to ground.

Fig. 3 discloses the connection for the A—D arm of Fig. 1 wherein either balanced or unbalanced impedances may be measured by connecting them in shunt with the A—D arm.

Fig. 4 shows a preferred connection for measuring balanced impedances by connecting them in shunt with the A—D arm.

Fig. 5 discloses a special transformer construction particularly adapted for the practice of this invention, and Fig. 6 is a section taken through the core and shields disclosing the means for balancing out voltages induced in the shields.

Referring now to Fig. 1, an alternating current bridge 1 having arms $Z_1$, $Z_2$, $Z_3$ and $Z_4$ is connected in conventional manner. A suitable detector 2, for instance of the heterodyne type with earphones, is connected across the output corners A and C. The input corners B and D are connected to a modulator $M_1$, which, in turn, is connected to a fixed frequency, low frequency oscillator 4 of frequency $f_0$ and to a variable frequency, high frequency oscillator 5 of frequency $f-f_0$. One of the side-bands from modulator $M_1$, for example the upper side-band of frequency $f$ is transmitted to the corners B and D of the bridge via conductors 6 and 7.

A second modulator $M_2$ is connected to oscillators 4 and 5 in a manner similar to modulator $M_1$. However, between oscillator 4 and modulator $M_2$ there is interposed a combined attenuator and phase shifter N adapted to control the magnitude and phase of the output from low frequency oscillator 4 and consequently also the magnitude and phase of the high frequency output of frequency $f$ from modulator $M_2$.

A high frequency transformer T is formed by a primary coil P and a secondary coil S. A shield $s_1$ is connected to the bridge corner A and is intended to electrostatically isolate secondary S.

A second shield $s_2$, grounded near the D corner, surrounds all four arms and is connected to corner D as shown. Primary P and secondary S are inductively coupled through shields $s_1$ and $s_2$. The output of modulator $M_2$ is connected to primary P as shown so that it receives the same frequency $f$ as the input terminals of the bridge. Terminals X and Y are provided for connecting the unknown and standard impedances into the A—D arm of the bridge. For reasons hereinafter disclosed it is desirable to terminate both windings of transformer T with a suitable resistance, so resistor 10 is shown terminating primary P while secondary S is terminated by a resistor 11 connected between shield $s_1$ and test terminal X. Primary P is additionally terminated by the output circuits of modulator $M_2$. It should here be noted that impedance arm $Z_3$ comprises the entire terminated impedance of transformer T as viewed from its secondary S.

The bridge as above described is adapted to measure an impedance unbalanced with respect to ground, that is, an impedance one terminal of which is maintained at ground potential. Should the impedance to be measured be adapted for connections balanced with respect to ground, the secondary of the transformer T should be balanced as shown in Fig. 2 wherein the shield $s_1$ is divided into two parts $s_1'$, $s_1'$, each enclosing one of the two halves of the secondary winding. Terminals X—Y are then changed as shown so as to permit inserting the impedances to be measured between the two parts of the secondary. The D corner is also disconnected from ground and from the shield $s_2$.

In Figs. 1 and 2 the impedances to be measured are connected in series with the bridge impedance $Z_3$ in the A—D arm. Measurements according to this invention may also be accomplished by connecting the impedance to be measured in shunt with the A—D arm.

Fig. 3 discloses how an unbalanced impedance $Z_x$ may be measured on the bridge of Fig. 1 by connecting it in shunt with the A—D arm. A strap 8 of negligible impedance is first connected to terminals X—Y to close the secondary windings. It is also possible to measure balanced impedances using the circuit of Fig. 3 by simply disconnecting the D corner of the bridge from ground and from shield $s_2$.

Fig. 4 shows preferred connections for the measurement of balanced impedances by the shunt or parallel method. Fig. 4 is usually preferable to Fig. 3 when balanced impedances are involved. However, for the present discussion the disclosure of Fig. 4 may be ignored in order to explain the invention in terms of a simple theory. The advantages of Fig. 4 will be explained in detail later in connection with an extended theory.

A bridge as in Fig. 1 usually has stray admittances to ground at the three corners A, C and D or at two corners only, for instance at A and C. In the latter case, it is helpful in effecting the preliminary balance to connect an admittance between the C and D corners as is well known. The admittance of the shield $s_1$ to the shield $s_2$ in Figs. 1 and 3 are considered lumped at the A corner, while the admittances from the two halves $s_1'$, $s_1'$ of shield $s_1$ in Fig. 2 are considered lumped at the A and D corners. If the impedance $Z_4$ is of the unbalanced type its admittance to ground is also lumped at D. If the impedance $Z_4$ is of the balanced type its admittances to ground are considered as a part of $Z_4$. The preliminary balance admittance connected between the C and D corners when the bridge itself has only two admittances to ground (at A and C) is always unbalanced and its admittance to ground is lumped at D.

Whether the bridge has admittances to ground at two or three corners depends upon the construction of the shielding as is well known in the art. If the bridge has admittances to ground at three corners, it is preferable to use in the $Z_3$ and $Z_4$ arms the combinations of apparatus disclosed in Table I below:

*Table I*

| Unknown impedance or standard | Series | | Parallel | |
| --- | --- | --- | --- | --- |
| | $Z_4$ | T | $Z_4$ | T |
| Unbalanced | Unbalanced | Unbalanced | Unbalanced | Unbalanced. |
| Balanced | Balanced | Balanced | do | do |

If the bridge has admittances to ground at only two corners, it is preferable to use the combination shown in Table II below:

*Table II*

| Unknown impedance or standard | Series | | Parallel | |
| --- | --- | --- | --- | --- |
| | $Z_4$ | T | $Z_4$ | T |
| Unbalanced | Unbalanced | Unbalanced | Unbalanced | Unbalanced. |
| Balanced | do | Balanced | do | Do. |

It is to be understood that an unbalanced standard must be used to standardize the bridge when measuring unknown unbalanced impedances and that a balanced standard must be used when unknown balanced impedances are being measured.

It is seen that a bridge for which $Z_4$ and T are unbalanced can be used to measure unbalanced impedances by either the series or parallel connections while balanced impedances are measured by only the parallel connections.

The several admittances lumped at the bridge corners are adjusted when making the preliminary balance as follows:

If the bridge has admittances at the A, C and D corners the admittance at A is preferably made equal to that at C whether D is grounded or not. With D not grounded the sum of the admittances at the A and C corners must be made equal to the admittance at the D corner.

If the bridge has admittances at the A and D corners only with an admittance connected between the C and D corners the admittance at the A corner is preferably made equal to the admittance between the C and D corners when D is grounded. When D is not grounded the admittance at the A corner must equal that at the D corner and the admittance between the C and D corners is preferably made equal to the admittance from A to ground in series with the admittance from D to ground.

The considerations in the two next preceding paragraphs assume a unity ratio bridge, that is, $Z_1$—$Z_2$. If $Z_1/Z_2$ is not equal to unity, the modifications in the adjustments of the admittances are obvious to any one familiar with the art. It is also well known that unity ratio bridges offer practical advantages in construction and operation. However, for the purposes of this invention, it is entirely immaterial what the actual values of the four impedances are. The only requirement is that for a given test frequency, the magnitudes and phase angles must be such that $Z_4$ is capable of effecting a balance.

In using the bridge of Fig. 1 for measurement of unbalanced impedances the bridge is given an initial balance with terminals X—Y shorted and switch 9 closed. Closing of switch 9 prevents transformer T from transferring energy of the test frequency into the A—D arm. The same result may be obtained by inserting sufficient loss in the attenuator of N. Balance is effected for a given test frequency from modulator $M_1$ by adjusting the variable impedance $Z_4$ until detector 2 indicates zero output voltage across the A—C corners. In effect, $Z_4$, is an auxiliary standard although its actual impedance is not known. The bridge is then standardized by inserting a known unbalanced impedance standard $Z_s$ in the A—D arm at terminals X—Y with its grounded side connected to the terminal Y. This unbalances the bridge and a final balance is effected by opening switch 9 and adjusting the combined attenuator and phase shifter N. Let the readings of N at this balance be $L_s$ decibels and $\Phi_s$ radians and let $N_s$ represent the complex number corresponding with these readings. The complex expression for $N_s$ may then be written as:

$$N_s = A_s \epsilon^{i\Phi_s} \qquad (1)$$

where:

$A_s = \epsilon^{L_s/20}$ $\epsilon$ = base of natural logarithms $i = \sqrt{-1}$ The bridge is now ready for measuring any numbering of unknown unbalanced impedances $Z_x$ at the given test frequency by merely individually connecting them to terminals X—Y in place of the known standard and by making final balances of the bridge by adjusting combined phase shifter and attenuator N, the reading of which may now be $L_x$ decibels and $\Phi_x$ radians. These readings may be combined into another complex number as $$N_x = A_x \epsilon^{i\Phi_x} \qquad (2)$$

where:

$A_x = \epsilon^{L_x/20}$

It can be shown by a mathematical analysis that:

$$Z_x = Z_s \cdot \frac{N_x}{N_s} = \frac{Z_s}{N_s} \cdot N_x = KN_x \qquad (3)$$

where:

$K = \dfrac{Z_s}{N_s}$ = a constant

It is of interest to note that $$\frac{N_x}{N_s} = \frac{A_x}{A_s} \epsilon^{i(\Phi_x - \Phi_s)} = \epsilon^{(L_x - L_s)/20} \epsilon^{i(\Phi_x - \Phi_s)} \qquad (4)$$

It should be noted that the magnitude of $$\frac{N_x}{N_s}$$

in Equation 4 is obtained from the factor $$\epsilon^{(L_x - L_s)/20}$$

in which the quantity ($L_x$—$L_s$) is the change in decibels of the loss through the network N of Fig. 1. The phase angle of $$\frac{N_x}{N_s}$$

is obtained from the quantity ($\Phi_x$—$\Phi_s$) which is the change in phase shift through the same network.

While in Equation 3 K is defined as a constant it must be remembered that due to the effect of various extraneous conditions, precise balance at high test frequencies cannot be expected to continue for too great a period so that the initial balance (and the adjustments of the admittances to ground at the bridge corners) and the final balances with $Z_s$ and $Z_x$ should not be made too far apart. The complex numbers $N_x$ and $N_s$ are important in determining the magnitude and phase of the voltage injected by the transformer T to get balance. The magnitude and phase of these voltages need not be known. It is only necessary to know the ratio of the two complex numbers $N_s$ and $N_x$ as indicated by Equation 3.

Measurements by the series method of impedances balanced to ground are made with the bridge of Fig. 1 by substituting the A—D arm of Fig. 2 for the one shown in Fig. 1. The procedure is otherwise the same as described above for unbalanced impedances.

A mathematical analysis for the shunt measurements according to Figs. 3 and 4 yields the following expression:

$$Z_x = \frac{Z_s N_s}{N_x} = \frac{K_1}{N_x} \qquad (5)$$

where $Z_x$, $Z_s$, $N_x$ and $N_s$ are as previously defined and $K_1 = Z_s N_s$ equals a constant. The same observations relating to the constant K of Equation 3 apply equally well to the constant $K_1$ in Equation 5. The measuring procedure for the shunt method is substantially the same as for the series method except that the unknown and standards are connected to the A—D corners instead of to terminals X—Y which for the shunt method are shorted by the low impedance strap 8. Equation 5 also indicates that it is only necessary to know the ratio of $N_x$ to $N_s$.

When the primary P of the transformer T is terminated as previously described, the impedance in the A—D arm (with test terminals X—Y connected together) can be made nearly constant over the frequency range of the equipment. With the admittances at the bridge corners adjusted in the manner already mentioned the impedance range of the variable auxiliary standard $Z_4$ can be made rather small which is a practical advantage. The termination of the secondary S of transformer T offers a similar advantage. The circuit connected between A and X in Fig. 1, for instance, acts as an impedance in series with an electromotive force in accordance with Thevenin's theorem. The secondary termination makes it possible to maintain the magnitude of this electromotive force fairly constant over the frequency range.

For purposes of explanation it has been necessary to describe rather specific bridge arrangements. To those familiar with this art, however, it will be quite evident that the principles enunciated and the method herein described are equally applicable to other well-known types of alternating current bridges and analogous networks. This also applies to the more extended theory hereinafter discussed.

In the circuit analysis for Fig. 1 referred to above it was assumed that the admittance between the shields $s_1$ and $s_2$ was lumped at the A corner so that all currents entering $Z_3$ from corner A will leave $Z_3$ at point X. A more precise analysis reveals that this is not strictly true and an error is particularly noticeable when measuring large impedances or at very high frequencies, or both. This is due to the fact that the admittance is not concentrated at the A corner as assumed but rather distributed in a very complex way all along between shield $s_1$ and shield $s_2$. It was necessary to consider this distribution since voltages are induced by the primary P in shield $s_1$ so that it is not an equipotential surface. Remarks similar to those above apply also to the lumping of admittances between shields at one or two bridge corners in connection with Figs. 2, 3 and 4.

A more extended theoretical analysis based on the aforesaid facts discloses that both balanced and unbalanced impedances may be measured free of these errors by the parallel method using either the apparatus of Fig. 3 or Fig. 4, although it is obviously preferable for the sake of symmetry to use the arrangement of Fig. 4 for measuring impedances balanced to ground.

The extended analysis also discloses that impedances may be measured, if desired, using the series method and proceeding essentially as previously described, but eliminating the errors introduced by the shield $s_1$ not being an equipotential surface by employing a plurality of standard impedances instead of only one and calculating the unknown impedance from the several readings taken. However, it has been found by experience that Equation 3 and the simple procedure described in connection therewith for the measurement of unbalanced or balanced impedances by the series method can be used even though the frequency or the impedance, or both, are quite high, by suitable design of the transformer T as will now be explained.

The transformer T is preferably constructed as shown in Fig. 5. The secondary winding S is wound about a toroidal core 24 of magnetic material. The shield $s_1$ is also toroidal and enclosed secondary S completely. One end of secondary S is connected to shield $s_1$ at 12 while the other end 14 is brought out through the extension 13 of shield $s_1$. A conductor 15 is also connected to shield $s_1$ at 16. The outer shield $s_2$ is also toroidal in shape and completely encloses the inner shield $s_1$. One end of the primary winding P is connected to shield $s_2$ at 19, the other end 26 being brought out through an extension 20 of shield 21 which is essentially an integral part of outer shield $s_2$. The toroidal shield 21 of which extension 20 is an integral part, is soldered to shield $s_2$ all around the edges 22 and 23 to completely enclose the primary winding P. Outer shield $s_2$ has three shield extensions 17, 18 and 20. Shield extension 17 forms the outer or ground shield for inner shield extension 13 and conductor 14. Shield extension 18 shields conductor 15, while shield extension 20 shields conductor 26.

Fig. 6 shows a section 6—6 of the core 24 and the shields $s_1$ and $s_2$ of Fig. 5. The overlapping edges of shield $s_1$ are insulated from each other and the overlapping edges of shield $s_2$ are similarly insulated. These overlapping edges of the two shields are located directly adjacent each other. Shield 21 of Fig. 5 is likewise separated with overlapping edges at points substantially adjacent the edges in shields $s_1$ and $s_2$. Condensers $C_1$ and $C_2$ are connected as shown between the shields. These overlapping edges are preferably located along the inner periphery of the toroid facing the center O as shown in Fig. 5, while the connection 16 of conductor 15 to shield $s_1$ is preferably made at the outer periphery of the toroid. It is evident, however, that these edges as well as the connection 16 may be disposed anywhere about the circumference of the toroidal section.

The connections to the bridge of Fig. 1 are indicated on Fig. 5 where conductor 15 connects to the A corner of the bridge, conductor 14 to the X test terminal and conductor 26 to modulator $M_2$. These connections have similar reference characters in Fig. 1. In comparing Figs. 1 and 5 it should be remembered that Fig. 1 is a circuit diagram and hence does not show a true physical configuration of the shielding.

Condensers $C_1$ and $C_2$ are provided to balance out the effect of voltages induced in shields $s_1$ and $s_2$ in so far as they affect detector 2. To do this the bridge is disconnected from modulator $M_1$ while the output of modulator $M_2$ is fed in to the transformer T. The test terminals X and Y are left open. The termination 11 of the secondary S is removed. Detector 2 is tuned to the frequency of oscillator 5. The capacities of condensers $C_1$ and $C_2$ are then adjusted until the detector response is a minimum. The connections to the secondary termination 11 and to the modulator $M_1$ are restored and the bridge is ready for use. It has been found from experience that the adjustments made as above described are independent of frequency over a wide frequency range.

While the foregoing description relates specifically to the construction of an unbalanced transformer it is clearly obvious to those skilled in this art how a balanced transformer should be constructed. That is to say the structural elements would be essentially the same as those disclosed for the unbalanced transformer of Fig. 5 except, of course, that secondary S would be divided in two parts S', S' as indicated schematically in Fig. 2. Likewise, the inner shield $s_1$ must be divided into two parts $s_1'$, $s_1'$, also indicated schematically in Fig. 2. Further detailed description of the balanced transformer is believed wholly unnecessary.

What is claimed is:

1. The method of measuring an impedance at a given alternating current frequency comprising connecting said impedance to an arm of a normally balanced electrical network whereby said network is unbalanced, rebalancing said network by injecting into the same arm a voltage of the given frequency and of controlled magnitude and phase, and determining the components of said impedance as a function of the magnitude and phase of said voltage.

2. The method of measuring an impedance at a given alternating current frequency comprising connecting said impedance in series with one arm of a normally balanced electrical network whereby said network is unbalanced, rebalancing said network by injecting into the same arm a voltage of the given frequency and of controlled magnitude and phase, and determining the components of said impedance as a function of the magnitude and phase of said voltage.

3. The method of measuring an impedance at a given alternating current frequency comprising connecting said impedance in shunt with one arm of a normally balanced electrical network whereby said network is unbalanced, rebalancing said network by injecting into the same arm a voltage of the given frequency and of controlled magnitude and phase and determining the components of said impedance as a function of the magnitude and phase of said voltage.

4. The method of measuring an impedance at a given alternating current frequency comprising connecting said impedance to an arm of a normally balanced electrical network whereby said network is unbalanced, rebalancing said network by injecting into the same arm a voltage of the given frequency and of controlled magnitude and phase, replacing said impedance with a known standard and again rebalancing said network by injecting into the same arm another voltage of the same given frequency and of controlled magnitude and phase, and determining the components of said impedance as a function of the standard impedance and the ratio of said two rebalancing voltages.

5. The method of measuring an impedance at a given alternating current frequency comprising connecting said impedance in series with one arm of a normally balanced electrical network whereby said network is unbalanced, rebalancing said network by injecting into the same arm a voltage of the given frequency and of controlled magnitude and phase, replacing said impedance with a known standard and again rebalancing said network by injecting into the same arm another voltage of the same given frequency and of controlled magnitude and phase and determining the components of said impedance as a function of the standard impedance and the ratio of said two rebalancing voltages.

6. The method of measuring an impedance at a given alternating current frequency comprising connecting said impedance in shunt with one arm of a normally balanced electrical network whereby said network is unbalanced, rebalancing said network by injecting into the same arm a voltage of the given frequency and of controlled magnitude and phase, replacing said impedance with a known standard and again rebalancing said network by injecting into the same arm another voltage of the same given frequency and of controlled magnitude and phase and determining the components of said impedance as a function of the standard impedance and the ratio of said two rebalancing voltages.

7. A device for measuring impedances comprising in combination a normally balanced electrical network containing a plurality of branches, means for connecting in one branch thereof an impedance to unbalance said network, and means for rebalancing said network comprising means for inserting in said branch a voltage of controlled magnitude and phase.

8. A device for measuring impedances comprising in combination a normally balanced electrical network containing a plurality of branches, means for connecting in series with one branch thereof an impedance to unbalance said network, and means for rebalancing said network comprising means for inserting in said branch a voltage of controlled magnitude and phase.

9. A device for measuring impedances comprising in combination a normally balanced electrical network containing a plurality of branches, means for connecting in shunt with one branch thereof an impedance to unbalance said network, and means for rebalancing said network comprising means for inserting in said branch a voltage of controlled magnitude and phase.

10. A device for measuring impedances comprising in combination a normally balanced alternating current bridge, means for connecting in one arm thereof an impedance to unbalance said bridge, and means for rebalancing said bridge comprising means for inserting in said arm a voltage of controlled magnitude and phase.

11. A device for measuring impedances comprising in combination a normally balanced alternating current bridge, means for connecting in series with one arm thereof an impedance to unbalance said bridge, and means for rebalancing said bridge comprising means for inserting in said arm a voltage of controlled magnitude and phase.

12. A device for measuring impedances comprising in combination a normally balanced alternating current bridge, means for connecting in shunt with one arm thereof an impedance to unbalance said bridge, and means for rebalancing said bridge comprising means for inserting in said arm a voltage of controlled magnitude and phase.

13. A device for measuring impedance at a given alternating current frequency comprising in combination an alternating current bridge containing four arms, means connected in one arm thereof adapted to initially balance said bridge at the given frequency, means for connecting in another arm thereof an impedance to be measured whereby said bridge becomes unbalanced, and means for rebalancing said bridge comprising means for inserting in said last-named arm a voltage of controlled magnitude and phase.

14. A device for measuring impedances at a given alternating current frequency comprising in combination an alternating current bridge containing four arms, means connected in one arm thereof adapted to initially balance said bridge at the given frequency, means for connecting in series with another arm thereof an impedance to be measured whereby said bridge becomes unbalanced, and means for rebalancing said bridge comprising means for inserting in said last-named arm a voltage of controlled magnitude and phase.

15. A device for measuring impedances at a given alternating current frequency comprising in combination an alternating current bridge containing four arms, means connected in one arm thereof adapted to initially balance said bridge at the given frequency, means for connecting in shunt with another arm thereof an impedance to be measured whereby said bridge becomes unbalanced, and means for rebalancing said bridge comprising means for inserting in said last-named arm a voltage of controlled magnitude and phase.

16. In a device for measuring impedances comprising in combination a normally balanced alternating current bridge, means for connecting in one arm thereof an impedance to unbalance said bridge, means for rebalancing said bridge comprising means for inserting in said arm a voltage of controlled magnitude and phase, said inserting means having as a part thereof a transformer, a core and primary and secondary windings therefor, an inner and an outer electrostatic shield surrounding said core and electrically insulated from each other, said inner shield surrounding only one of said windings, said outer shield surrounding said inner shield and also enveloping said other winding, a detector for said bridge, and means connected between said shields adapted to reduce to a minimum the effect of the voltages induced therein upon said detector.

17. In a device for measuring impedances comprisinging in combination a normally balanced alternating current bridge, means for connecting in one arm thereof an impedance to unbalance said bridge, means for rebalancing said bridge comprising means for inserting in said arm a voltage of controlled magnitude and phase, said inserting means having as a part thereof a transformer, a core and primary and secondary windings therefor, an inner and an outer electrostatic shield surrounding said core and electrically insulated from each other, said inner shield surrounding only one of said windings, said outer shield surrounding said inner shield and also enveloping said other winding, a detector for said bridge, and capacity means connected between said shields adapted to reduce to a minimum the effect of the voltages induced therein upon said detector.

18. In a device for measuring impedances comprising in combination a normally balanced alternating current bridge, means for connecting in one arm thereof an impedance to unbalance said bridge, means for rebalancing said bridge comprising means for inserting in said arm a voltage of controlled magnitude and phase, said inserting means having as a part thereof a transformer, a core and primary and secondary windings therefor, an inner and an outer electrostatic shield surrounding said core and electrically insulated from each other, said inner shield surrounding only the secondary winding, said outer shield surrounding said inner shield and also enveloping said primary winding, a detector for said bridge, and means connected between said shields adapted to reduce to a minimum the effect of the voltages induced therein upon said detector.

SAMUEL A. LEVIN.